(12) United States Patent
Kodama et al.

(10) Patent No.: US 7,372,449 B2
(45) Date of Patent: May 13, 2008

(54) DISPLAY DEVICE, IMAGE DISPLAY DEVICE AND DISPLAY METHOD

(75) Inventors: Kenichi Kodama, Kanagawa (JP);
Seiichi Inoue, Kanagawa (JP); Ryoichi Yamamoto, Kanagawa (JP); Kazuo Sanada, Kanagawa (JP); Koichi Kimura, Kanagawa (JP); Tsutomu Yokouchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 793 days.

(21) Appl. No.: 10/935,737

(22) Filed: Sep. 8, 2004

(65) Prior Publication Data

US 2005/0099666 A1  May 12, 2005

(30) Foreign Application Priority Data

Sep. 8, 2003  (JP)  ............... 2003-315681

(51) Int. Cl.
*G09G 3/34* (2006.01)
(52) U.S. Cl. .................. 345/108; 345/55; 345/60; 345/84; 345/85; 345/107
(58) Field of Classification Search .............. 345/108, 345/107, 84, 85, 60, 55
See application file for complete search history.

(56) References Cited

U.S. PATENT DOCUMENTS 4,505,539 A * 3/1985 Auracher et al. ............ 385/19
5,731,792 A    3/1998 Sheridon
5,966,153 A   10/1999 Mitani et al.
6,452,650 B1 * 9/2002 Nakao et al. ............... 349/86
6,753,936 B2 * 6/2004 Tanaka ....................... 349/106
7,106,400 B1 * 9/2006 Tsuda et al. ................ 349/113
2006/0292296 A1 * 12/2006 Ishizaki et al. ............. 427/162

FOREIGN PATENT DOCUMENTS

JP      5-127603 A    5/1993
JP      5-127604 A    5/1993
JP     08-254962 A   10/1996
JP    2001-42794 A    2/2001

* cited by examiner

Primary Examiner—Richard Hjerpe
Assistant Examiner—Leonid Shapiro
(74) Attorney, Agent, or Firm—Sughrue Mion, PLLC (57) ABSTRACT

The display device includes a display portion having a cavity portion surrounded by wall surfaces, at least one part of the wall surfaces being formed of a transparent member and forming a structural color forming surface provided with fine asperities having predetermined regularity, a liquid being hermetically sealed to have a liquid surface in the cavity portion and having a refractive index approximately equivalent to that of the transparent member, an actuator giving a disturbance to the liquid to bring the liquid into contact with the forming surface and a control unit controlling driving of the actuator to switch reflection and transmission characteristics of light when the light is incident into the forming surface, thereby controlling color display using reflected light formed by the forming surface.

13 Claims, 6 Drawing Sheets

DISPLAY DEVICE, IMAGE DISPLAY DEVICE AND DISPLAY METHOD

BACKGROUND OF THE INVENTION

The present invention relates to a display device, an image display device and an image display method, and more particularly to a display device, an image display device and a display method used for a thin image display device such as a flat panel display.

Heretofore, a liquid crystal display (LCD) device has been widely used as an image display device of an information terminal apparatus such as a personal computer or a portable information terminal (personal digital assistance: PDA) or of a car navigation system. While a liquid crystal display device using TFTs has advantages in that response speed thereof is fast and it can display a clear multicolor moving picture, the liquid crystal display device has disadvantages in that power consumption thereof is high, electric power is required for maintaining an image, a viewing angle thereof is narrow, and so on, because the liquid crystal display device requires an illumination light source such as a backlight and light utilization efficiency of the illumination light source is also low.

Therefore, image display devices according to various methods have been proposed as replacements of the liquid crystal display device. For example, a display device which switches ON/OFF of image display by use of a film boiling phenomenon of liquid has been proposed (for example, refer to JP 05-127603 A and JP 05-127604 A). Moreover, a display device which switches ON/OFF of image display in the manner in which ink is moved by use of electrocapillarity has also been proposed (for example, refer to JP 10-039799 A).

Furthermore, there has also been proposed a display device which switches ON/OFF of image display in the manner in which ink is loaded/unloaded to/from an image display unit by thermally expanding and shrinking ink in segments or mechanically driving diaphragms (for example, refer to JP 2001-042794 A). Still further, there has also been proposed a display device which switches ON/OFF of image display in the manner in which ink is moved by use of electrostatic force (for example, refer to JP 08-254962 A).

However, in each of the image display devices utilizing the film boiling phenomenon of fluid, which are disclosed in JP 05-127603 A and JP 05-127604, when color display is attempted, it is necessary to spread the respective cells of red (R), green (G), and blue (B) or the respective cells of cyan (C), magenta (M), and yellow (Y) in a horizontal direction. Accordingly, each of the image display devices has problems in that the light utilization efficiency is in principle poor and in that contrast of the device is low. Moreover, in the display device disclosed in JP 10-039799 A, the respective types of ink, which correspond to red (R), green (G), and blue (B), are compounded in the same cell, and accordingly, the light utilization efficiency is improved. However, the device involves a problem in that it is difficult to let a desired color come out after rewriting because it is difficult to separate the image into the three colors when the image display is turned off.

Furthermore, according to such a method of thermally expanding or shrinking ink, which is disclosed in JP 2001-042794 A, a thermal expansion coefficient of the ink is low, and accordingly, a volume change of the ink is as small as approximately 2% even if the ink is heated up to 300 K to 350 K. Therefore, when one attempts to secure a predetermined volume change, a considerably large reservoir tank with respect to a volume of the image display unit is necessary, leading to a problem of upsizing of the device. Moreover, according to such a method of mechanically driving the diaphragms, the structure of the device becomes complicated, leading to a problem in that downsizing of the device is inhibited. Furthermore, in the display device disclosed in JP 08-254962 A, the respective color cells corresponding to cyan (C), magenta (M), and yellow (Y) form a stacked structure. Accordingly, in order to set a certain color in a non-display state, ink corresponding to the color must be moved under the other cell. Therefore, there arise a problem of the deterioration of image quality due to step differences occurring in an array of the cells, and a problem of the movement of ink taking a long time and hence low responsiveness.

SUMMARY OF THE INVENTION

The present invention has been made in order to solve the above-described problems. It is an object of the present invention to provide a display device which has high light utilization efficiency, contrast, and response speed, is capable of displaying a multicolor moving picture, has a simple structure, and can be downsized and formed into a stacked structure, and to provide an image display device and a display method implemented in the display device and the image display device.

In order to attain the object described above, the present invention provides a display device comprising a display portion which has a cavity portion surrounded by wall surfaces, at least one part of the wall surfaces being formed of a transparent member and forming a structural color forming surface provided with fine asperities having predetermined regularity, a liquid which is hermetically sealed so as to have a liquid surface in the cavity portion, and has a refractive index approximately equivalent to a refractive index of the transparent member, an actuator which gives a disturbance to the liquid to bring the liquid into contact with the structural color forming surface, and a control unit which controls driving of the actuator to switch reflection and transmission characteristics of light when the light is incident into the structural color forming surface, thereby controlling color display using reflected light formed by the structural color forming surface.

Preferably, the actuator comprises a heater element which heats the liquid, and the heater element generates Marangoni convection by heating the liquid and allows the liquid to be ejected onto the structural color forming surface. The above-described Marangoni convection refers to a convection phenomenon of ink, which occurs owing to a difference in surface tension of the ink, the difference resulting from a partial difference in temperature of the ink.

Here, the structural color forming surface may be provided with the fine asperities having a predetermined cycle.

Preferably, the display portion includes a wall surface into which the light having transmitted through the structural color forming surface is incident, and the wall surface is formed of a transparent member such that the light having transmitted through the structural color forming surface transmits through the wall surface.

Here, the display portion may include a black layer onto which the light having transmitted through the structural color forming surface is incident.

Also, the liquid may be transparent and colorless.

Moreover, the display device of the present invention is constructed of a multilayer structure in which plural units are stacked on one another, each unit being assembled from the display portion, the liquid and the actuator in a layer, the display portion in each unit includes a wall surface into which the light having transmitted through the structural color forming surface is incident, the wall surface is formed of a transparent member such that the light having transmitted through the structural color forming surface transmits through the wall surface, and the fine asperities with which the structural color forming surfaces of the display portions are provided are different from one another in regularity.

Furthermore, the display device is constructed of a multilayer structure in which plural units are stacked on one another, each unit being assembled from the display portion, the liquid, and the actuator in a layer, the fine asperities with which the structural color forming surfaces of the display portions in respective units include are different from one another in regularity, the display portions in remaining layers excluding a lowermost layer among the respective layers include wall surfaces into which the light having transmitted through the structural color forming surface is incident, the wall surfaces are formed of transparent members such that the light having transmitted through the structural color forming surface transmits through the wall surfaces, and the display portion in the lowermost layer includes a black wall surface onto which the light having transmitted through the structural color forming surface is incident.

In addition, the present invention provides an image display device, comprising a segment matrix in which plural segments are arrayed in matrix, each segment being constructed by arraying plural display devices, and a driving circuit which is connected to the arrayed plural display devices and drives at least one of the arrayed plural display devices to allow an image to be formed on the segment matrix, wherein each of the arrayed plural display devices comprises display portion which has a cavity portion surrounded by wall surfaces, at least one part of the wall surfaces being formed of a transparent member and forming a structural color forming surface provided with fine asperities having predetermined regularity, a liquid which is hermetically sealed so as to have a liquid surface in the cavity portion, and has a refractive index approximately equivalent to a refractive index of the transparent member, an actuator which gives a disturbance to the liquid to bring the liquid into contact with the structural color forming surface, and a control unit which controls driving of the actuator to switch reflection and transmission characteristics of light when the light is incident into the structural color forming surface, thereby controlling color display using reflected light formed by the structural color forming surface.

And, the present invention provides an image display device, comprising a segment matrix in which plural display devices are arrayed in matrix, and a driving circuit which is connected to the plural display devices arrayed in the matrix and drives at least one of the plural display devices arrayed in the matrix to allow an image to be formed on the segment matrix, wherein each of the plural display devices arrayed in the matrix comprises a display portion which has a cavity portion surrounded by wall surfaces, at least one part of the wall surfaces being formed of a transparent member and forming a structural color forming surface provided with fine asperities having predetermined regularity, a liquid which is hermetically sealed so as to have a liquid surface in the cavity portion, and has a refractive index approximately equivalent to a refractive index of the transparent member, an actuator which gives a disturbance to the liquid to bring the liquid into contact with the structural color forming surface, and a control unit which controls driving of the actuator to switch reflection and transmission characteristics of light when the light is incident into the structural color forming surface, thereby controlling color display using reflected light formed by the structural color forming surface.

Preferably, the display device is constructed of a multilayer structure in which plural units are stacked on one another, each unit being assembled from the display portion, the liquid and the actuator in a layer, the display portion in each unit includes a wall surface into which the light having transmitted through the structural color forming surface is incident, the wall surface is formed of a transparent member such that the light having transmitted through the structural color forming surface transmits through the wall surface, and the fine asperities with which the structural color forming surfaces of the display portions are provided are different from one another in regularity.

Preferably, the display device is constructed of a multilayer structure in which plural units are stacked on one another, each unit being assembled from the display portion, the liquid, and the actuator in a layer, the fine asperities with which the structural color forming surfaces of the display portions in respective units include are different from one another in regularity, the display portions in remaining layers excluding a lowermost layer among the respective layers include wall surfaces into which the light having transmitted through the structural color forming surface is incident, the wall surfaces are formed of transparent members such that the light having transmitted through the structural color forming surface transmits through the wall surfaces, and the display portion in the lowermost layer includes a black wall surface onto which the light having transmitted through the structural color forming surface is incident.

In order to attain the object described above, the present invention provides a display method, comprising previously forming a structural color forming surface in which at least one part of wall surfaces of a cavity portion is formed of a transparent member and which is provided with fine asperities having predetermined regularity on at least one part, and controlling reflection and transmission characteristics of light on the structural color forming surface to exhibit a predetermined structural color by bringing, into contact with the structural color forming surface, a liquid having a refractive index approximately equivalent to a refractive index of the transparent member when the light is incident into the structural color forming surface, thereby controlling color display. Specifically, a contact state and non-contact state of the liquid with the structural color forming surface are controlled, thus performing control of the color display.

The present invention provides a display device which has high light utilization efficiency, contrast, and response speed, has a simple structure, requires less power consumption and can be downsized and formed into a stacked structure as compared with a conventional display device, and an image display device using a plurality of the display devices, and an image display method associated with the display device and the image display device.

This application claims priority on Japanese patent application No.2003-315681, the entire contents of which are hereby incorporated by reference. In addition, the entire contents of literatures cited in this specification are incorporated by reference.

BRIEF DESCRIPTION OF THE DRAWINGS

In the accompanying drawings:

FIGS. 4A to 4J are longitudinal sectional views showing operating states of the display device according to the first embodiment of the present invention;

DETAILED DESCRIPTION OF THE PREFERRED EMBODIMENTS

First Embodiment

Figure 1:
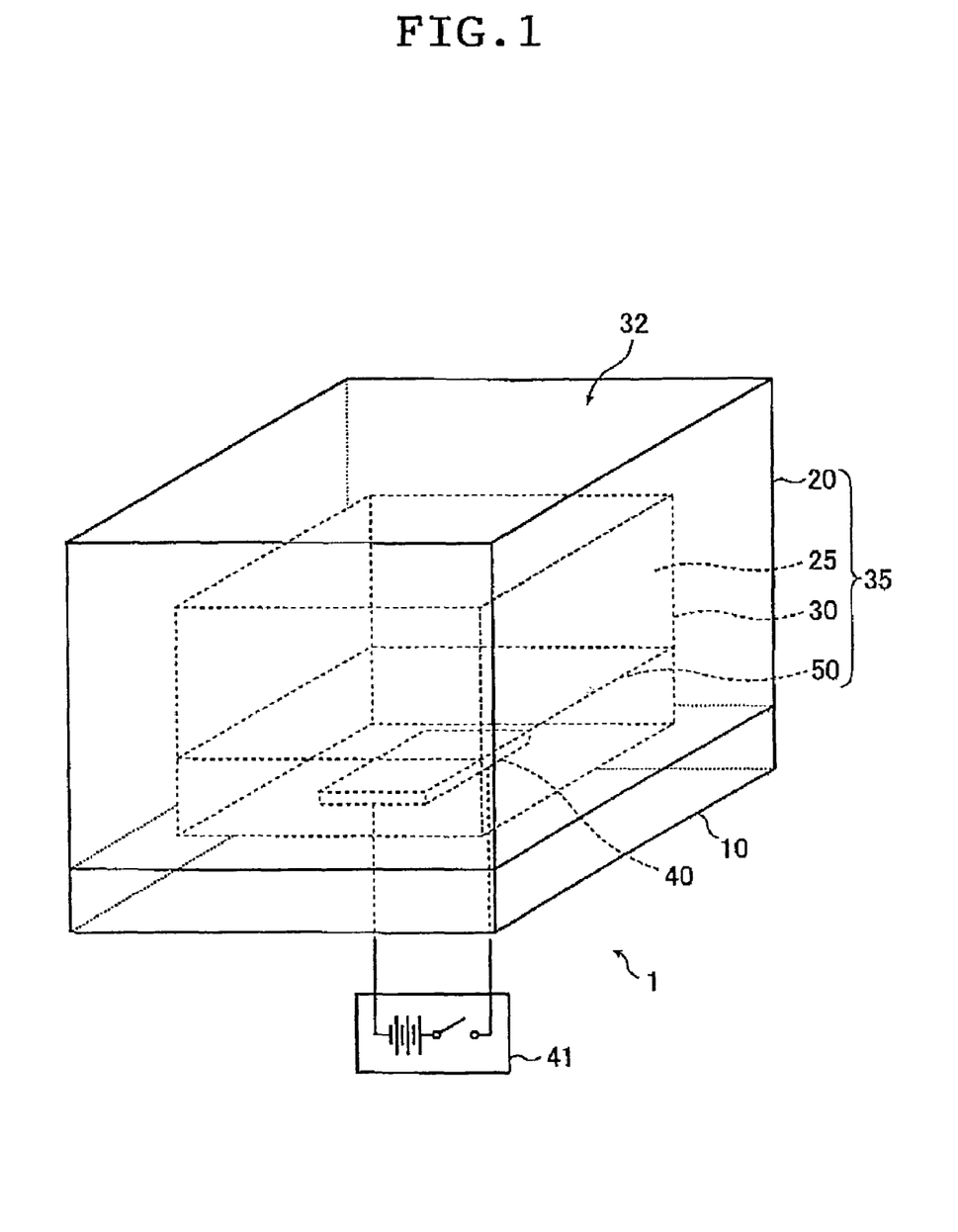
FIG. 1 is a perspective view of a display device according to a first embodiment of the present invention.
Figure 2:
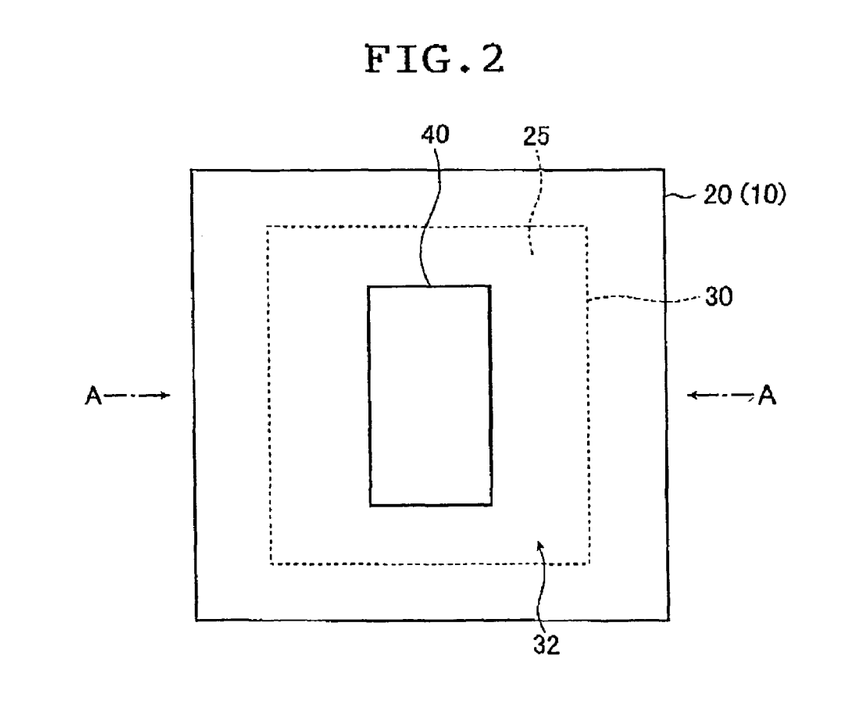
FIG. 2 is a plan view of the display device according to the first embodiment of the present invention.
Figure 3:
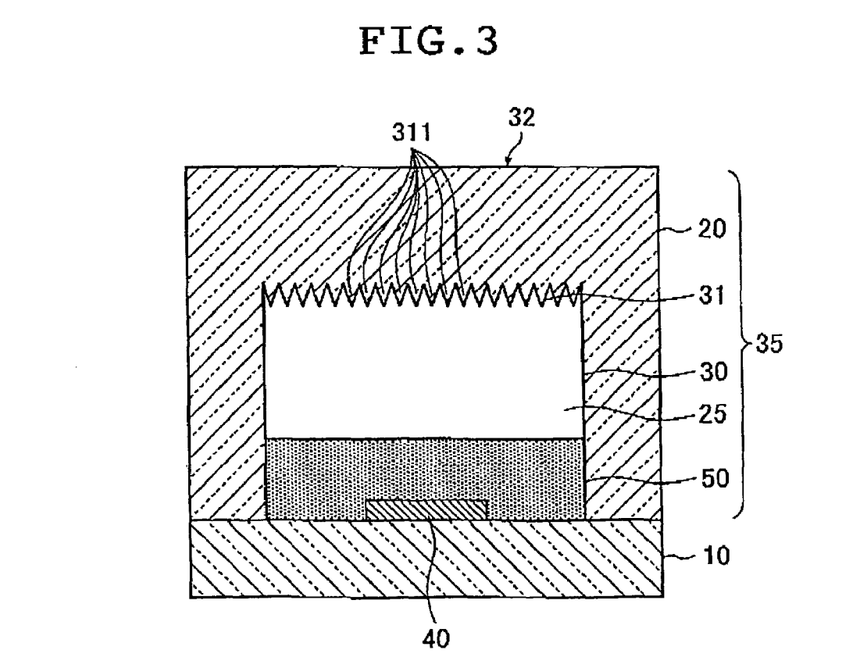
FIG. 3 is a longitudinal cross-sectional view of the display device according to the first embodiment of the present invention.

A display device of the present invention will be described below. FIG. 1 is a perspective view showing a display device 1 as an embodiment of the display device of the present invention. FIG. 2 is a plan view of the display device 1, and FIG. 3 is a longitudinal sectional view showing a cut surface obtained by cutting the display device 1 along a plane which passes through a line A-A in FIG. 2 and is perpendicular to a sheet surface. As shown in FIGS. 1 to 3, in the display device 1 according to this embodiment, a light transmitting substrate 20 as a transparent member is stacked on a support substrate 10.

A material of the support substrate 10 is not particularly limited as long as it is provided with visible light transmission characteristics and resistance to a liquid 50 to be described later (hereinafter, referred to as "liquid resistance"). Examples of such a material include glass and acrylic resin. A thickness of the support substrate 10 is not particularly limited. Typically, one with a thickness ranging from 5 to 1,000 μm is used as the support substrate 10. It is preferable to use a support substrate 10 with a thickness of approximately 200 μm.

A material constituting the light transmitting substrate 20 is not particularly limited as long as it is provided with the visible light transmission characteristics and the liquid resistance and can hermetically seal the liquid 50 to be described later in a cavity portion 25 to be described later when being stacked on an upper surface of the support substrate 10. Examples of such a material include glass and resins such as acrylic resins. No particular limitations are imposed on a thickness of the light transmitting substrate 20 as long as the thickness is larger than a height of the cavity portion 25 to be described later. Typically, it is preferable to use the light transmitting substrate 20 with a thickness ranging from 100 to 300 μm.

Formed in the light transmitting substrate 20 stacked on the support substrate 10, a concave portion recessed from one surface (bottom surface) of the light transmitting substrate 20 toward the other surface (upper surface) opposite to the one surface. Formed between this concave portion and the support substrate 10 is the cavity portion 25, for example, in a cuboidal shape. The upper portion and side surfaces of this cavity portion 25 are surrounded by wall surfaces 30 of the light transmitting substrate 20. Moreover, a bottom of the cavity portion 25 is closed by the upper surface of the support substrate 10, and a display portion 35 having the cavity portion 25 surrounded by the wall surfaces is formed. Furthermore, in this display device 1, the upper surface of the light transmitting substrate 20 becomes a color display surface 32 on which color display is performed by specific wavelength light reflected on a structural color forming surface 31 to be described later.

The size and shape of the cavity portion 25 are not particularly limited. Typically, the height of the cavity portion 25 (vertical length in FIG. 3, which is measured from a joint surface of the cavity portion 25 to the support substrate 10) ranges from 50 to 200 μm. With regard to the width (horizontal length in FIG. 2) and depth (vertical length in FIG. 2) of the cavity portion 25, when color display is attempted for an image, typically, it is preferable that both of the width and depth range from 50 to 300 μm although the width and depth vary depending on the size of the color display surface 32. For the cavity portion 25, one with the width and the depth equal to 50 μm and 100 μm, respectively, is mentioned.

In the wall surfaces 30 surrounding the cavity portion 25, the structural color forming surface 31 including fine asperities (fine uneven shapes) 311, 311, ... is formed on an upper portion thereof in FIG. 3. The fine asperities 311, 311, ... have predetermined regularity and form light of a specific color, i.e., light with a specific wavelength as reflected light, that is, exhibit a structural color. However, reference numerals 311, 311, ... schematically show the fine asperities. Here, the "structural color" refers to a color exhibited by a surface making light with a specific wavelength incident thereonto or reflect thereon in the following manner without an original color of the surface itself being exhibited. Specifically, the incident and reflecting surface reflects the light with the specific wavelength thereon or transmits the light therethrough by interference, diffraction, and diffusion of the light based on a relationship between the wavelength of the light and a shape of the surface onto which the light is made incident. The size of the fine asperities of this structural color forming surface 31 is set according to the wavelength of the light to be reflected, and eventually, according to the color to be displayed by the reflected light.

It is preferable to previously implement a liquid repellent treatment for at least a part of the wall surfaces 30 of the cavity portion 25 against the liquid 50 to be described later. Here, the "liquid repellent treatment" refers to a treatment for imparting property of repelling the liquid 50 to the wall surfaces concerned and the like. For example, in the case of using a water-based liquid 50, a water repellent treatment applies to the "liquid repellent treatment", and in the case of using an oil-based liquid 50, a hydrophilic treatment applies to the "liquid repellent treatment."

A method for the liquid repellent treatment is not particularly limited. Examples of the water repellent treatment as one of the liquid repellent treatments include: a method involving coating a water repellent agent of a fluorine coating material series such as Cytop (registered trademark); and a method involving implementing a fluorine plasma treatment. The liquid repellent treatment is implemented for the wall surfaces 30, and thus separating property of the wall surfaces 30 from the liquid 50 is improved. Accordingly, high response speed can be realized when the liquid 50 brought into contact with the wall surfaces 30 is separated from the wall surfaces 30 and transferred to a non-contact state.

A predetermined amount of the liquid 50 is contained in the cavity portion 25. The liquid 50 for use in the present invention is not particularly limited as long as it is a transparent and colorless liquid having a refractive index equivalent to that of the light transmitting substrate 20.

Arranged on the bottom of the cavity portion 25, that is, on the upper surface of the support substrate 10 is a heater 40 as an actuator. The liquid 50 is contained in the cavity portion 25, and the liquid 50 and an upper surface of the heater 40 are adapted to be brought into contact with each other. Upon receiving supply of electric power from a driving circuit and wiring lines as driving means, for example, an electric circuit 41, the heater 40 heats the liquid 50 brought into contact with the heater 40 in the cavity portion 25.

A material constituting the heater 40 is not particularly limited. Examples of the material include an alloy as described below. This alloy is formed of a publicly known material for use in a usual ink-jet head, for example, a ternary-alloy thin-film resistor of Ta—Si—O and the like, which is disclosed in JP 3194465 B. Moreover, the composition of this alloy is 64 to 85 atomic % of Ta, 5 to 26 atomic % of Si, and 6 to 15 atomic % of O.

This ternary-alloy thin-film resistor is excellent in electric corrosion resistance and durability in a liquid. This ternary-alloy thin-film resistor eliminates the need for providing a protective layer such as a protective layer for the electric corrosion resistance, and the ternary-alloy thin-film resistor can be brought into direct contact with the liquid 50. Accordingly, in the case of using the heater 40 composed of this ternary-alloy thin-film resistor, heat generated from the heater 40 can be rapidly transmitted to the liquid 50. Typically, as a size of the heater 40, width and depth thereof equal to approximately 20 μm and 20 μm, respectively, are mentioned.

The display device 1 as described above drives the heater 40 with electric power in a degree not to expand the liquid 50 and utilizes a disturbance by the Marangoni convection caused by temperature dependency of surface tension of the liquid 50, thus ejecting the liquid 50 and bringing the ejected liquid 50 into contact with the structural color forming surface 31 formed on the upper portion of the cavity portion 25. Examples of driving means for causing the Marangoni convection include the electric circuit 41 which controls the electric power supplied to the heater 40 arranged on the bottom of the cavity portion 25 and heating the liquid 50 hermetically sealed in the cavity portion 25.

Figure 4A:
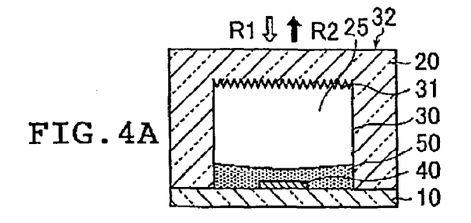

An operation principle of the display device according to this embodiment, which utilizes the Marangoni convection, will be described below. FIGS. 4A to 5B are longitudinal sectional views of the display device 1 according to this embodiment. First, in the cavity portion 25 containing the transparent and colorless liquid 50, the thickness of the cavity portion 25 being defined by the light transmitting substrate 20, in a state where the heater 40 is not driven, as shown in FIGS. 4A and 5A, the liquid 50 in the cavity portion 25 is made to stand still, and the structural color forming surface 31 on the upper portion of the cavity portion 25 is in a non-contact state with the liquid 50.

Figure 5A:
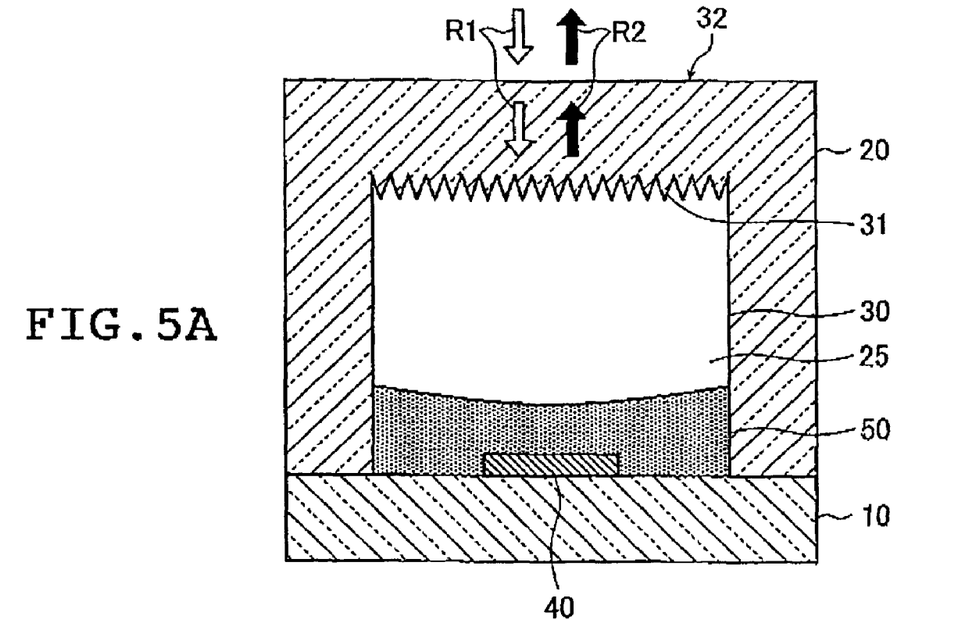
FIGS. 5A and 5B are longitudinal sectional views showing transmitting states of light through the display device according to the first embodiment of the present invention.

In this state, when light R1 as white light is incident onto the light transmitting substrate 20 from the color display surface 32 side, the incident light R1 transmits through the light transmitting substrate 20 and is made incident onto the structural color forming surface 31 from above in FIG. 5A.

At this time, it is assumed that fine asperities reflecting only light with a wavelength corresponding to a specific color, for example, red (R), are formed on the structural color forming surface 31. Then, as shown in FIG. 5A, among the incident light R1, only the light with the wavelength corresponding to red (R) is reflected as light R2. The light R2 reflected on the structural color forming surface 31 travels as shown in FIG. 5A, and reaches the color display surface 32. Hence, color display of red (R) is performed on the color display surface 32 by the light R2. Specifically, the color display surface 32 turns in an ON state of the color display.

Figure 4B:
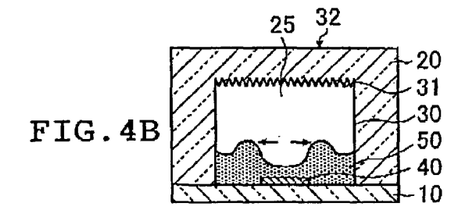

Next, in the state shown in FIGS. 5A and 4A, the heater 40 arranged on the bottom of the cavity portion 25 is driven to generate heat. Then, the heat of the heater 40 is transferred to the surface of the liquid 50, and the surface tension of the liquid 50 in this region (that is, the heated region) lowers. Then, the liquid 50 immediately on the heater 40 is pulled by the liquid 50 having relatively high surface tension in an outer peripheral portion (peripheral region) of the heater 40. Thus, as shown in FIG. 4B, a surface of the liquid is changed, and outward traveling waves of the liquid (in a direction shown by arrows in FIG. 5B) are generated.

Figure 4C:
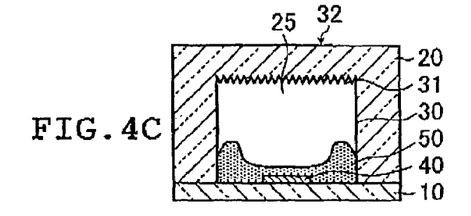
Figure 4D:
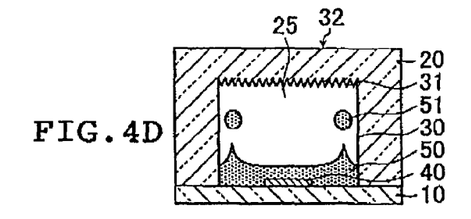
Figure 4E:
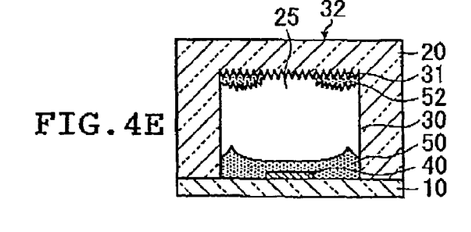

Subsequently, as shown in FIG. 4C, when the outward traveling waves of the liquid collide against the wall surfaces 30 of the side portions of the cavity portion 25, a component of velocity of the liquid 50 diverts its course upward, and the surface of the liquid 50 protrudes upward along the wall surfaces 30 of the side portions of the cavity portion 25. Subsequently, as shown in FIG. 4D, the liquid 50 is partially ejected upward as mists 51. As shown in FIG. 4E, the ejected mists 51 are brought into contact with the structural color forming surface 31 formed on the upper portion of the cavity portion 25, and form a liquid film 52 of the liquid 50. The liquid 50 forming the liquid film 52 has the refractive index equivalent to that of the light transmitting substrate 20. Accordingly, this liquid film 52 is brought into contact with the fine asperities of the structural color forming surface 31, so that the fine asperities of the structural color forming surface 31 optically disappear.

Figure 4F:
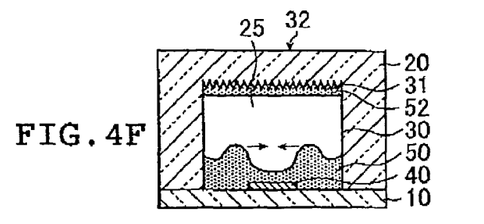
Figure 4G:
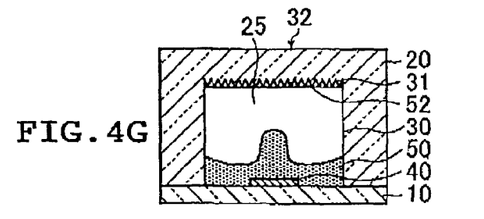
Figure 4H:
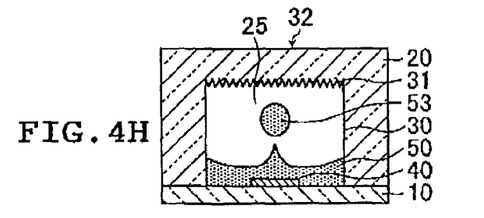

Subsequently, the heater 40 is stopped to stop generating the heat, and the surface of the liquid 50 is then cooled down, and thus a difference in surface tension between the vicinity (heated region) of the heater 40 and the outside (peripheral region) of the heater 40 is reduced. As a result of this, as shown in FIG. 4F, traveling waves of the liquid are generated in an inward direction in FIG. 4F owing to resilience of the meniscus or capillary attraction of the exposed wall surfaces 30 of the cavity portion 25. Those inner traveling waves of the liquid collide against each other as shown in FIG. 4G at, for example, a center portion of the heater 40, and thus the liquid 50 is partially ejected upward as a mist 53 as shown in FIG. 4H.

Figure 4I:
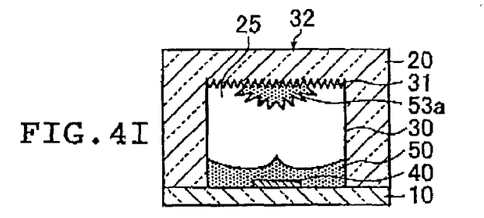
Figure 4J:
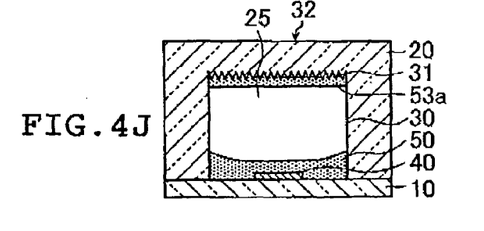

As shown in FIGS. 4I and 4J, the ejected mist 53 is brought into contact with the structural color forming surface 31 formed on the upper portion of the cavity portion 25, and forms a liquid film 53a of the liquid 50. This liquid film 53a is brought into contact with the fine asperities of the structural color forming surface 31, thus making the structural color forming surface 31 optically disappear.

The operations described above are repeated periodically, and thus the mists 51 and 53 of the liquid 50 are ejected continuously, and the liquid 50 is brought into contact with the structural color forming surface 31 formed on the upper portion of the cavity portion 25. In such a way, the fine asperities formed on the structural color forming surface 31 are made to optically disappear, and the upper portion of the cavity portion 25 is made into a light transmitting state.

Figure 5B:
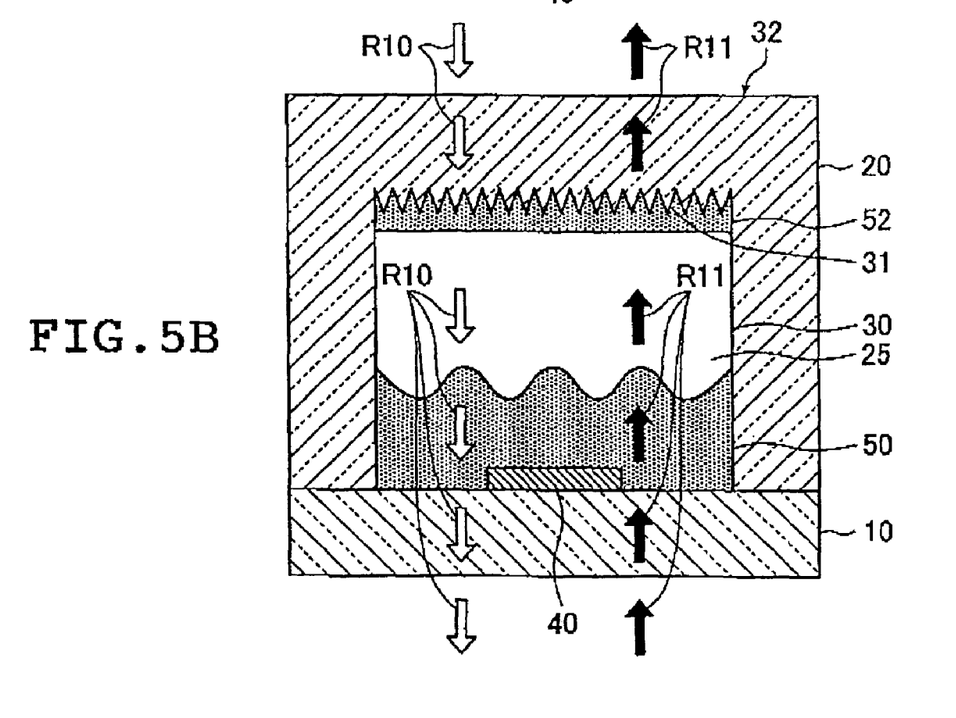

Therefore, as shown in FIG. 5B, light R10 incident from the color display surface 32 side sequentially transmits through the light transmitting substrate 20 and the structural color forming surface 31, is made incident onto the cavity portion 25, transmits through the liquid film 52 brought into contact with the structural color forming surface 31 and through an upper space of the cavity portion 25, and is made incident onto the liquid 50 contained in the lower portion of the cavity portion 25. The liquid 50 is transparent and colorless in this embodiment, and accordingly, the light R10 transmits through the liquid 50, and is further made incident into the support substrate 10 under the liquid 50. The support substrate 10 also has the light transmission characteristics, and accordingly, the light R10 further transmits through the support substrate 10, and is made incident onto a layer (for example, a reflecting layer) adjacent to a lower side of the support substrate 10.

Meanwhile, because the support substrate 10 has the light transmission characteristics; light can be also made incident from the lower surface side of the support substrate 10. For example, in the case where the reflecting layer is provided on the lower side of the support substrate 10, when reflected light R11 is made incident onto the support substrate 10, this light R11 travels through the above-described path of the light R10 in a reverse direction as shown in FIG. 5B. Specifically, the light R11 transmits through the support substrate 10, the liquid 50, the upper space of the cavity portion 25, the liquid film 52, the structural color forming surface 31, and the light transmitting substrate 20 in this order, and reaches the color display surface 32. When this light R11 is white light, the color display surface 32 becomes a colorless surface with high brightness. Specifically, no color display by light showing a specific color is performed, and the color display surface 32 turns in an OFF state of the color display.

Subsequently, when a predetermined period of time is allowed to pass in a state where the heater 40 is stopped, the liquid 50, which has been brought into contact with the structural color forming surface 31 and has formed the liquid film 53a, falls owing to gravity. As a result, the structural color forming surface 31 turns again in the state where the liquid 50 is not brought into contact with the surface 31, and returns again to the state of FIGS. 4A and 5A, that is, to the ON state of the color display. Furthermore, because of a function of the liquid repellent treatment on the structural color forming surface 31, the structural color forming surface 31 quickly turns in a state where the liquid 50 is not brought into contact with the surface 31.

As described above, in the display device 1 according to this embodiment, when the heater 40 is not driven, the color display by the specific wavelength light formed by being reflected on the structural color forming surface 31, for example, the color display of red (R), is performed on the display portion 35, and the display portion 35 turns in the ON state of the color display. On the other hand, when the heater 40 is driven, the display portion 35 turns in the light transmitting state like glass, and turns in the OFF state of the color display.

Specifically, in the display device 1 according to this embodiment, the non-contact state of the liquid 50 (state of FIG. 5A) and the contact state of the liquid 50 (state of FIG. 5B where the liquid film 52 is formed) are controlled for the structural color forming surface 31 by controlling the drive of the heater 40. In the state where the liquid 50 is brought into contact with the structural color forming surface 31, the fine asperities formed of the liquid 50 on the structural color forming surface 31 are made to optically disappear. Accordingly, the structural color forming surface 31 turns in the transmission state for the light incident onto the display portion 35, and the light of the specific color, which should be originally reflected on the structural color forming surface 31, is not reflected. Thus, the specific color is not displayed on the color display surface 32, and the color display turns OFF.

On the other hand, in the state where the liquid 50 is in the non-contact state with the structural color forming surface 31, the structural color forming surface 31 appears on the upper portion of the cavity portion 25. Then, because of the fine asperities formed on the structural color forming surface 31, the structural color forming surface 31 turns in the reflecting state for the light showing the specific color among the light incident onto the display portion 35. Thus, the color shown by the light concerned is displayed on the color display surface 32, and the color display turns ON. In such a way, the reflection and transmission characteristics of the structural color forming surface 31 are switched depending on whether or not the liquid 50 is brought into contact with the structural color forming surface 31.

When a black layer (not shown) is previously arranged on the lower surface side of the support substrate 10 in the above-described OFF state of the color display, the incident light R10 is absorbed to the black layer. Accordingly, no light displaying the specific color appears on the color display surface 32, and no color display is performed on the color display surface 32.

Moreover, instead of the black layer, a white layer or a reflecting layer reflecting light may also be arranged on the lower surface side of the support substrate 10. In this case, reflected light, which is formed in the manner in which the light is reflected on the white layer or a mirror reflecting layer, travels through the path of the light R10 in the reverse direction, and reaches the color display surface 32. The reflected light is the light reflected on the white layer or mirror reflecting layer. Accordingly, display of a color corresponding to a spectral wavelength of the reflected light or colorless display is performed on the color display surface 32.

As described above in detail, in the display device 1 according to this embodiment, the ON/OFF of the color display by the structural color forming surface 31 are controlled depending on whether or not the structural color forming surface 31 and the liquid 50 are brought into contact with each other. When the display device 1 is allowed to perform color display, the display device 1 is allowed not to disturb the liquid 50 or not to eject the liquid 50 onto the structural color forming surface 31, and thus to form, among the incident light, the specific wavelength light by the reflection thereof on the fine asperities of the structural color forming surface 31, and to perform the display of the specific color.

In other words, it is unnecessary to apply illumination light from the bottom of the support substrate 10 by an illumination light source such as a backlight for display in the specific color. Therefore, as compared with a conventional liquid crystal display device which turns light from the backlight into colored light by means of color filters for display, the display device 1 can minimize its power consumption by the amount that may be consumed by the illumination light source.

Moreover, when a multicolor display is performed, the plural display devices 1 according to this embodiment can be stacked in a vertical direction with respect to the traveling direction of the light. Therefore, a display unit with the structure, for example, in which three display devices displaying the respective colors of red (R), green (G), and blue (B) are vertically stacked, can be produced. In the display unit of such a three-layer structure, an area of the color display surface of the display portion of each display device corresponds to an area of a color display surface capable of the color display in the display unit. Accordingly, a display unit having high light utilization efficiency can be obtained. Even in the case of utilizing the illumination light source such as the backlight, as compared with the conventional liquid crystal display device which controls each brightness of red (R), green (G), and blue (B) to display one color when displaying the one color, a display unit having high utilization efficiency of the light from the illumination light source can be obtained because the area of the color display surface of each display device corresponds to the display area where the color display is attempted in the display unit. Moreover, also with regard to a contrast of the image, the structure in which the plural display devices are stacked is adopted, thus making it possible to perform color display having a high contrast.

Furthermore, in the display device 1 according to this embodiment, a volume of ink or specific liquid is not changed, but switching is performed between the contact and non-contact of the liquid 50 with the structural color forming surface 31 to thereby perform ON/OFF-control of the color display. Therefore, an amount of the liquid 50 for use can be suppressed to be as small as possible, and it is not necessary to provide a reservoir tank as in JP 2001-042794 A. As a result, the display device can be downsized. Moreover, a physical phenomenon occurring in a short time, which is called the Marangoni convection, is utilized. Accordingly, response speed of the display device 1 is so fast that it is possible to display a moving picture. Note that the switching can be rapidly performed from the contact state of the liquid 50 with the structural color forming surface 31 to the non-contact state thereof by implementing the liquid repellent treatment for the structural color forming surface 31.

Moreover, the color display is performed by utilizing the optical characteristics of the structural color forming surface 31, which are reflection and transmission characteristics. Accordingly, as the support substrate 10, the light transmitting substrate 20, and the liquid 50, transparent ones are used. As a result, the plural display devices can be stacked.

The present invention is not limited to the above-described embodiment. For example, the transparent support substrate 10 having the light transmission characteristics is used in the above-described embodiment, and a light-reflecting type support substrate which is not transmissive of light can also be used. In the case of using the light-reflecting type support substrate which is not transmissive of light as the support substrate 10, a specific-color layer is formed on the surface of the support substrate, thus making it possible to perform color display of the specific color of the layer formed on the surface of the support substrate when the display device 1 is driven not to allow the color display of the structural color by the structural color forming surface 31.

Moreover, the above-described embodiment has been described by taking as an example the case of disturbing the liquid by the Marangoni convection by use of the heater 40 as an actuator. However, the liquid 50 may also be disturbed by a method other than heating by the heater. Furthermore, the liquid 50 may also be brought into contact with the structural color forming surface 31 by a method other than the Marangoni convection. For example, there are methods of controlling the contact and non-contact of the liquid with the structural color forming surface by disturbance using an ultrasonic wave or a piezoelectric element and mechanical disturbance for the liquid by using a diaphragm, and the like.

Second Embodiment

Figure 6:
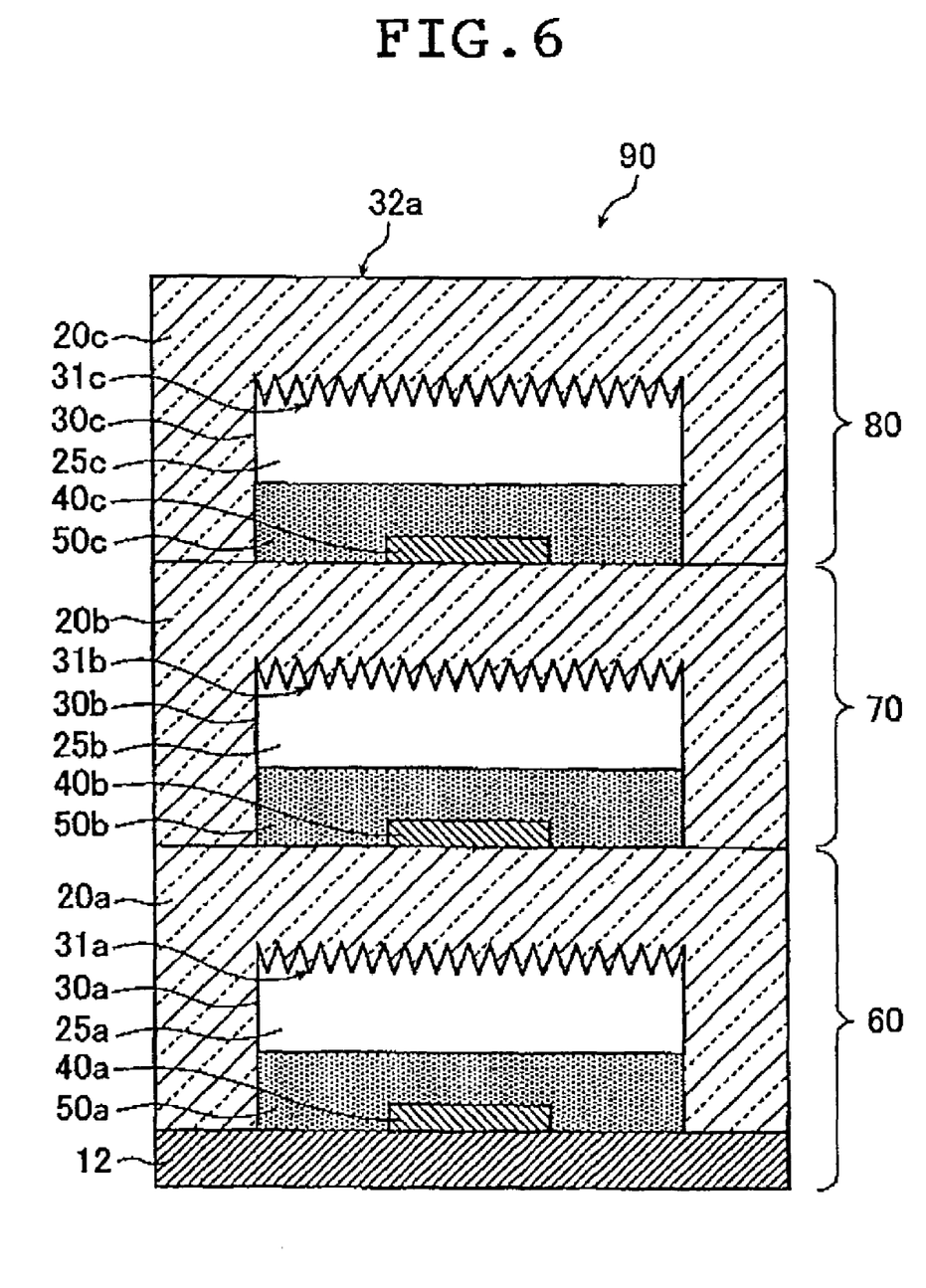
FIG. 6 is a longitudinal sectional view of a display unit according to a second embodiment of the present invention.

Next, a second embodiment of the present invention will be described. In this embodiment, a display unit provided with a multilayer structure in which the plural display devices are stacked will be described. FIG. 6 is a longitudinal sectional view showing a state where the display unit according to this embodiment is cut along a vertical plane. The display unit according to this embodiment is provided with a multilayer structure in which a plurality of units are stacked, the units each being a display device similar to the display device 1 described in the above-described first embodiment. In this display unit, regularities of fine asperities which structural color forming surfaces in the respective layers have are different from one another. Specifically, as shown in FIG. 6, a display unit 90 according to this embodiment is provided with a multilayer structure in which three display devices 60, 70, and 80 are stacked in a vertical direction in FIG. 6. Each of the display devices 60, 70, and 80 is provided with the structure similar to that of the display device 1 of the above-described first embodiment.

In the display device 60, a cavity portion 25a surrounded by wall surfaces 30a is formed inside a light transmitting substrate 20a stacked on a support substrate 12 having light transmission characteristics, a heater 40a is provided on the bottom of the cavity portion 25a, and the cavity portion 25a contains a transparent and colorless liquid 50a having a refractive index equivalent to that of the light transmitting substrate 20a. On the upper portion of the cavity portion 25a, a structural color forming surface 31a which has fine asperities and produces reflected light with a specific wavelength corresponding to a specific color, for example, red (R), is formed.

In the display device 70, a light transmitting substrate 20b is stacked on the light transmitting substrate 20a, a cavity portion 25b surrounded by wall surfaces 30b is formed inside the light transmitting substrate 20b, a heater 40b is provided on the bottom of the cavity portion 25b, and the cavity portion 25b contains a transparent and colorless liquid 50b having a refractive index equivalent to that of the light transmitting substrate 20b. On the upper portion of the cavity portion 25b, a structural color forming surface 31b which has fine asperities and produces reflected light with a specific wavelength corresponding to a specific color, for example, green (G), is formed.

In the display device 80, a light transmitting substrate 20c is stacked on the light transmitting substrate 20b, a cavity portion 25c surrounded by wall surfaces 30c is formed inside the light transmitting substrate 20c, a heater 40c is provided on the bottom of the cavity portion 25c, and the cavity portion 25c contains a transparent and colorless liquid 50c having a refractive index equivalent to that of the light transmitting substrate 20c. On the upper portion of the cavity portion 25c, a structural color forming surface 31c which has fine asperities and produces reflected light with a specific wavelength corresponding to a specific color, for example, blue (B), is formed.

Wiring lines (not shown) are individually connected to the above-described respective heaters 40a, 40b, and 40c, and the heaters 40a, 40b, and 40c are connected to a driving circuit (not shown). In order to perform color display in the display unit 90, the above-described respective heaters 40a, 40b, and 40c are selectively driven by the above-described driving circuit to maintain, in the non-contact state with the liquid, the structural color forming surface of the display device on which the color display is to be performed among the respective display devices 60, 70, and 80. Thus, the selected display device is allowed to perform color display by means of the light reflected on any of the respective structural color forming surfaces 31a, 31b, and 31c.

For example, when a color display surface 32a of the display unit 90 is used for the color display of red (R), the heater 40b and the heater 40c are driven. By driving the heaters in such a way, the display devices 70 and 80 do not perform color display, and only the display device 60 produces the reflected light of red (R) by the structural color forming surface 31a, thus performing color display. In a similar way, when the color display surface 32a of the display unit 90 is used for the color display of green (G), only the heaters 40c and 40a are driven, and when the color display surface 32a of the display unit 90 is used for the color display of blue (B), only the heaters 40a and 40b are driven.

When only the uppermost display device 80 is allowed to perform the color display, the respective heaters 40b and 40a of the middle display device 70, and the lowermost display device 60 may be kept at rest like the heater 40c. Moreover, when only the middle display device 70 is allowed to perform the color display, only the heater 40c is driven, and the respective heaters 40b and 40a of the middle display device and the lowermost display device 60 may be left stopped.

Moreover, in order to realize color display of black (K) with the color display surface 32a of the display unit 90, a method of driving the heaters 40a, 40b, and 40c in a state where a black layer is formed under the support substrate 12 is illustrated. In a similar way, in order to realize color display of white (W) with the color display surface 32a of the display unit 90, a method of not driving all of the heaters 40a, 40b, and 40c is illustrated. Note that, instead of forming the black layer under the support substrate 12, the black layer may be formed on a surface of or inside the support substrate 12. Moreover, in the case of performing the color display by utilizing transmitted light in the display unit 90, illustrated is a method of irradiating, from a lower surface side of the support substrate 12 in FIG. 6, with light from an illumination light source such as a backlight.

Furthermore, by driving only one heater among the heaters 40a, 40b, and 40c, the color display surface 32a of the display unit 90 enables color display of cyan (C), magenta (M), or yellow (Y). Specifically, by driving only the heater 40a, green (G) light reflected on the structural color forming surface 31b and blue (B) light reflected on the structural color forming surface 31c overlap each other, and thus the color display of cyan (C) is performed on the color display surface 32a.

Moreover, by driving only the heater 40b, red (R) light reflected on the structural color forming surface 31a and the blue (B) light reflected on the structural color forming surface 31c overlap each other, and thus the color display of magenta (M) is performed on the color display surface 32a. In a similar way, by driving only the heater 40c, the red (R) light reflected on the structural color forming surface 31a and the green (G) light reflected on the structural color forming surface 31b overlap each other, and thus the color display of yellow (Y) is performed on the color display surface 32a.

Specifically, two ways of control, i.e., drive and stop, can be performed independently for each of the three heaters 40a, 40b, and 40c, and accordingly, eight ways in total ($2^3$ ways) of color display control are possible. The color display surface 32a of the display unit 90 can be correspondingly allowed for color display in eight colors in total which are, red (R), green (G), blue (B), cyan (C), magenta (M), yellow (Y), black (K), and white (W). Furthermore, by controlling drive times of the heaters 40a, 40b, and 40c, time-division drive for color display is performed, thus making it possible to perform color display in various ways.

For example, assuming that the respective colors of red (R), green (G), and blue (B) are subjected to time division by eight bits, the heaters 40b and 40c are driven for the red (R) display for a time T, the heaters 40c and 40a are driven for the green (G) display for a time 100T/256, and the heaters 40a and 40b are driven for the blue (B) display for a time 100T/256 on the assumption that the total time is T. In such a way, a color display of digital data in three colors of R, G, and B ((R,G,B)=(255,99,99)) can be performed.

As described above, in the display unit 90 according to this embodiment, the three display devices 60, 70, and 80 are stacked on one another. Therefore, the ON/OFF-control of each color display of red (R), green (G), and blue (B) can be independently performed by the one display unit 90. Moreover, the liquids 50a, 50b, and 50c are brought into contact and non-contact with the structural color forming surfaces 31a, 31b, and 31c, respectively, by utilizing the Marangoni convection, and thus the ON/OFF-control of each color display is carried out. Accordingly, response speed of the display unit 90 is so fast that it is possible to display a color moving picture.

Note that, in the display unit 90 according to this embodiment, the display unit 80 which performs the color display of blue (B) is arranged at the uppermost stage, the display unit 70 which performs the color display of green (G) is arranged at the middle stage, and the display unit 60 which performs the color display of red (R) is arranged at the lowermost stage; however, the present invention is not limited to this arrangement.

Moreover, this embodiment has been described by taking as an example the display unit 90 provided with the three-layer structure in which the three display devices are stacked on one another. However, it is also possible to produce a display unit with a two-layer structure in which two display devices are stacked on each other, and a four-or-more-layer structure in which four or more display devices are stacked on one another. Furthermore, description has been made for the display unit 90 in which the display devices 60 to 80 performing the color displays of the respective colors of red (R), green (G), and blue (B) in this embodiment. However, display devices displaying colors other than these red (R), green (G), and blue (B) may be stacked on one another.

Third Embodiment

Figure 7:
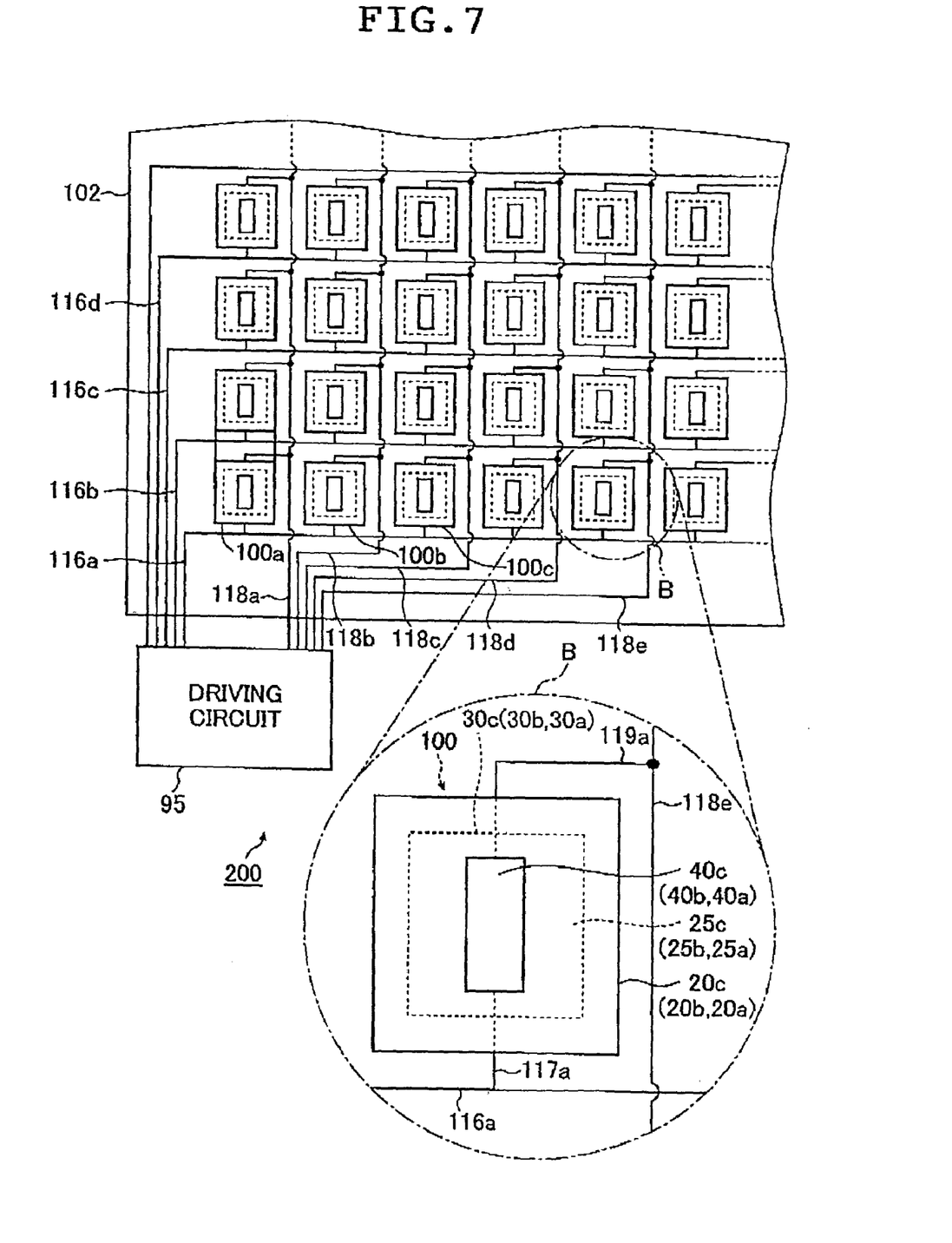
FIG. 7 is a plan view of an image display device according to a third embodiment of the present invention.

Next, an image display device according to a third embodiment of the present invention will be described. In this embodiment, an image display device with a structure in which the plural display units according to the above-described second embodiment are arranged in matrix will be described. FIG. 7 is a view showing a schematic configuration of the image display device according to this embodiment. As shown in FIG. 7, in the image display device 200 according to this embodiment, the plural display units are regularly arrayed in matrix on a board 102. The respective display units are display units 100a, 100b, 100c . . . which are the same as the display unit 90 of the above-described second embodiment. FIG. 7 is an enlarged plan view showing in a small circle 5, one of the display units arrayed on the image display device 200.

As shown in the small circle B of FIG. 7, the plural display units 100a, 100b, 100c, . . . are arranged on an upper surface of the image display device 200. As in the display unit 90 of the above-described second embodiment, each of the display units 100a, 10b, 100c, . . . has a multilayer structure in which the display devices each including a cavity portion inside a light transmitting substrate which contains a transparent and colorless liquid, are stacked at three stages. As in the display unit 90 shown in FIG. 6, in each of the display devices of the display unit 100, a light transmitting substrate 20c (20b, 20a) is stacked on a support substrate, a cavity portion 25c (25b, 25a) surrounded by wall surfaces 30a (30b, 30c) is formed inside the light transmitting substrate 20c (20b, 20a), and a heater 40c (40b, 40a) is arranged on the bottom of the cavity portion 25c (25b, 25a). A transparent and colorless liquid (not shown) is contained in the cavity portion 25c (25b, 25a). Note that in FIG. 7, the display device at the lowermost stage and the display device at the middle stage, which is arranged thereon, will be omitted.

Connected to the respective display units 100a, 100b, 100c, . . . are wiring lines 117 and 119, and through the wiring lines 117 and 119, the respective display units 100a, 100b, 100c, . . . are connected to lateral wiring lines 116a, 116b, 116c, 116d . . . and longitudinal wiring lines 118a, 118b, 118c, 118d, . . . The other ends are connected to a driving circuit 95. For example, in the display unit 100 shown in the small circle B, the heater 40c at the uppermost stage is connected to the lateral wiring line 116a through a wiring line 117a, and connected to the longitudinal wiring line 118e through a wiring line 119a, and the lateral wiring line 116a and the longitudinal wiring line 118e are connected to the driving circuit 95. In a similar way, the heater 40b at the middle stage and the heater 40a at the lowermost stage are also connected to the driving circuit 95 through lateral and longitudinal wiring lines (not shown).

In order to realize color display with a color display surface of the display unit 100, the heater 40c (40b, 40a) is driven by the driving circuit 95 through the lateral wiring line 116, the wiring line 117, the longitudinal wiring line 118 and the wiring line 119, ON/OFF-control of the color display is thus performed for each of the three display devices constituting the display unit 100, and thus the color display surface on an upper surface of the display unit 100 is allowed for desired color display. In a similar way, also with regard to the display units 100a, 100b, 100c, . . . , drive of the respective heaters for the respective display units 100a, 100b, 100c, . . . is controlled by the driving circuit 95 based on image signals, and thus color display surfaces of the respective display units 100a, 100b, 100c, . . . are allowed for predetermined color display. As described above, the display units 100a, 100b, 100c, . . . of the present invention are arrayed in matrix and driven by the driving circuit 95, thus making it possible to obtain an image display device forming a multicolor image.

In the image display device as described above, the desired color display can be performed for each of the respective display units 100a, 100b, 100c, . . . , and accordingly, one display unit can be used as one segment as the minimum unit for the color display. As a result, in the case of performing a predetermined color display by one segment, a display area of the one segment is large, and accordingly, a delicate image having extremely high resolution can be displayed on the image display device.

Note that, in this embodiment, description has been made of the image display device composed by arraying cells in matrix, the cells each being formed of the display unit with the three-layer structure in which the three display devices 60, 70, and 80 are stacked at the three stages. However, the image display device is not limited to this. An image display device composed by arraying cells in matrix, the cells each being formed of a display unit obtained by arraying the three display devices 60, 70, and 80 in the horizontal direction, can also be produced.

What is claimed is:

1. A display device, comprising:
   a display portion which has a cavity portion surrounded by wall surfaces, at least one part of said wall surfaces being formed of a transparent member and forming a structural color forming surface provided with fine asperities having predetermined regularity;
   a liquid which is hermetically sealed so as to have a liquid surface in said cavity portion, and has a refractive index approximately equivalent to a refractive index of said transparent member;
   an actuator which gives a disturbance to said liquid to bring said liquid into contact with said structural color forming surface; and
   a control unit which controls driving of said actuator to switch reflection and transmission characteristics of light when the light is incident into said structural color forming surface, thereby controlling color display using reflected light formed by said structural color forming surface.

2. The display device according to claim 1, wherein
   said actuator comprises a heater element which heats said liquid; and
   said heater element generates Marangoni convection by heating said liquid and allows said liquid to be ejected onto said structural color forming surface.

3. The display device according to claim 1, wherein said structural color forming surface is provided with said fine asperities having a predetermined cycle.

4. The display device according to claim 1, wherein said display portion includes a wall surface into which said light having transmitted through said structural color forming surface is incident, and said wall surface is formed of a transparent member such that said light having transmitted through said structural color forming surface transmits through said wall surface.

5. The display device according to claim 1, wherein said display portion includes a black layer onto which said light having transmitted through said structural color forming surface is incident.

6. The display device according to claim 1, wherein said liquid is transparent and colorless.

7. The display device according to claim 1, wherein
   said display device is constructed of a multilayer structure in which plural units are stacked on one another, each unit being assembled from said display portion, said liquid and said actuator in a layer,
   said display portion in each unit includes a wall surface into which said light having transmitted through said structural color forming surface is incident, said wall surface is formed of a transparent member such that said light having transmitted through said structural color forming surface transmits through said wall surface, and
   said fine asperities with which said structural color forming surfaces of said display portions are provided are different from one another in regularity.

8. The display device according to claim 1, wherein
said display device is constructed of a multilayer structure in which plural units are stacked on one another, each unit being assembled from said display portion, said liquid, and said actuator in a layer,
said fine asperities with which said structural color forming surfaces of said display portions in respective units include are different from one another in regularity,
said display portions in remaining layers excluding a lowermost layer among said respective layers include wall surfaces into which said light having transmitted through said structural color forming surface is incident, said wall surfaces are formed of transparent members such that said light having transmitted through said structural color forming surface transmits through said wall surfaces, and said display portion in said lowermost layer includes a black wall surface onto which said light having transmitted through said structural color forming surface is incident.

9. An image display device, comprising:
a segment matrix in which plural segments are arrayed in matrix, each segment being constructed by arraying plural display devices; and
a driving circuit which is connected to said arrayed plural display devices and drives at least one of said arrayed plural display devices to allow an image to be formed on said segment matrix,
wherein each of said arrayed plural display devices comprises:
a display portion which has a cavity portion surrounded by wall surfaces, at least one part of said wall surfaces being formed of a transparent member and forming a structural color forming surface provided with fine asperities having predetermined regularity;
a liquid which is hermetically sealed so as to have a liquid surface in said cavity portion, and has a refractive index approximately equivalent to a refractive index of said transparent member;
an actuator which gives a disturbance to said liquid to bring said liquid into contact with said structural color forming surface; and
a control unit which controls driving of said actuator to switch reflection and transmission characteristics of light when the light is incident into said structural color forming surface, thereby controlling color display using reflected light formed by said structural color forming surface.

10. An image display device, comprising:
a segment matrix in which plural display devices are arrayed in matrix; and
a driving circuit which is connected to said plural display devices arrayed in the matrix and drives at least one of said plural display devices arrayed in the matrix to allow an image to be formed on said segment matrix,
wherein each of said plural display devices arrayed in the matrix comprises:
a display portion which has a cavity portion surrounded by wall surfaces, at least one part of said wall surfaces being formed of a transparent member and forming a structural color forming surface provided with fine asperities having predetermined regularity;
a liquid which is hermetically sealed so as to have a liquid surface in said cavity portion, and has a refractive index approximately equivalent to a refractive index of said transparent member;
an actuator which gives a disturbance to said liquid to bring said liquid into contact with said structural color forming surface; and
a control unit which controls driving of said actuator to switch reflection and transmission characteristics of light when the light is incident into said structural color forming surface, thereby controlling color display using reflected light formed by said structural color forming surface.

11. The display device according to claim 10, wherein
said display device is constructed of a multilayer structure in which plural units are stacked on one another, each unit being assembled from said display portion, said liquid and said actuator in a layer,
said display portion in each unit includes a wall surface into which said light having transmitted through said structural color forming surface is incident, said wall surface is formed of a transparent member such that said light having transmitted through said structural color forming surface transmits through said wall surface, and
said fine asperities with which said structural color forming surfaces of said display portions are provided are different from one another in regularity.

12. The display device according to claim 10, wherein
said display device is constructed of a multilayer structure in which plural units are stacked on one another, each unit being assembled from said display portion, said liquid, and said actuator in a layer,
said fine asperities with which said structural color forming surfaces of said display portions in respective units include are different from one another in regularity,
said display portions in remaining layers excluding a lowermost layer among said respective layers include wall surfaces into which said light having transmitted through said structural color forming surface is incident, said wall surfaces are formed of transparent members such that said light having transmitted through said structural color forming surface transmits through said wall surfaces, and said display portion in said lowermost layer includes a black wall surface onto which said light having transmitted through said structural color forming surface is incident.

13. A display method, comprising:
previously forming a structural color forming surface in which at least one part of wall surfaces of a cavity portion is formed of a transparent member and which is provided with fine asperities having predetermined regularity on said at least one part; and
controlling reflection and transmission characteristics of light on said structural color forming surface to exhibit a predetermined structural color by bringing, into contact with said structural color forming surface, a liquid having a refractive index approximately equivalent to a refractive index of said transparent member when said light is incident into said structural color forming surface, thereby controlling color display.

* * * * *